United States Patent Office 2,868,630
Patented Jan. 13, 1959

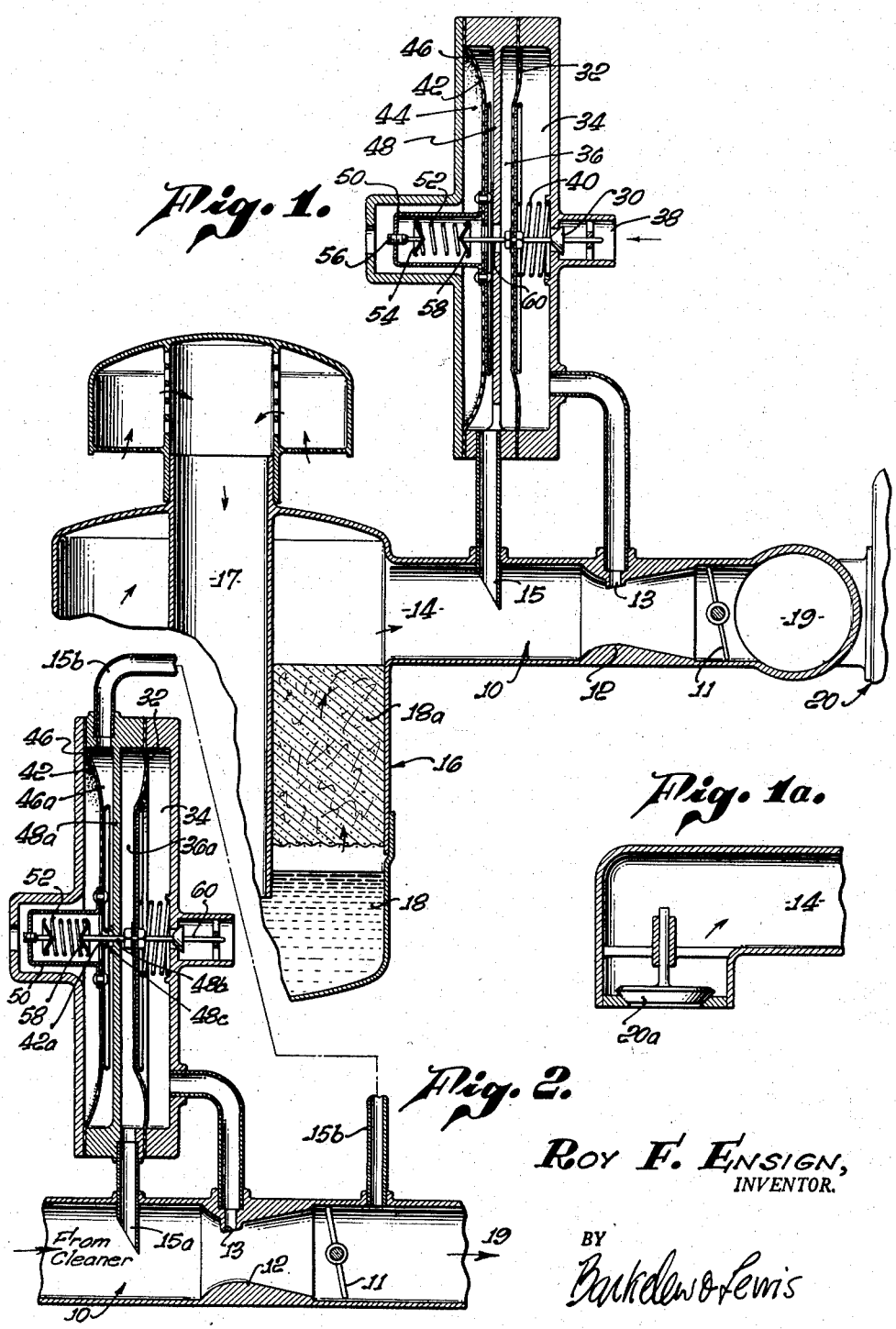

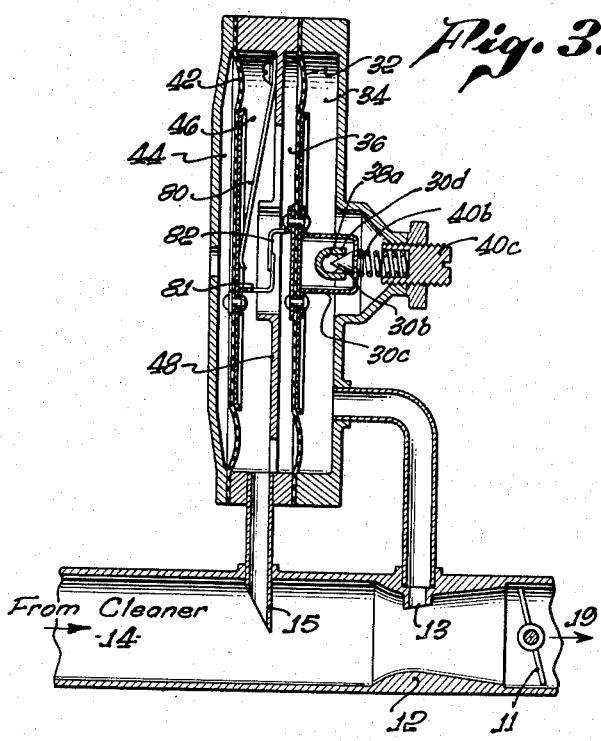

2,868,630

GASEOUS FUEL FEED SYSTEMS FOR INTERNAL COMBUSTION ENGINES

Roy F. Ensign, Fullerton, Calif., assignor to Ensign Carburetor Company, Huntington Park, Calif., a corporation of California Original application December 9, 1952, Serial No. 324,986, now Patent No. 2,799,564, dated July 16, 1957. Divided and this application April 22, 1957, Serial No. 654,276

12 Claims. (Cl. 48—184)

The present invention has to do with gaseous fuel feed systems for fuel consuming devices which take their fuel via a fuel nozzle that is subjected to a fuel inspiring depression developed by the velocity of air flow. Typical, is an internal combustion engine fed with gaseous fuel via a fuel nozzle which is subjected to the velocity depression attendant the flow of air drawn by the engine through the throat of a venturi. In such systems the gaseous fuel is fed to the fuel nozzle under control of a pressure regulator which is adjusted to deliver fuel at a pressure slightly under the normal standing pressure of the effective surrounding atmosphere. Typically the regulator delivers its gaseous fuel to the fuel nozzle at a pressure of about one-quarter inch of water under the effective atmospheric pressure, to insure closure of the regulator valve when the pressure in the delivery chamber becomes atmospheric with the engine standing.

The depression at the fuel nozzle in the venturi throat then has to be at least that one-quarter inch in order to draw in any fuel at all; and in the absence of some special provision, no fuel or insufficient fuel will be drawn in during starting turn-over or idling operation of the engine. Typically, starting fuel is provided by choking the air intake of the venturi; and idling fuel is provided via an idling by-pass which applies suction from the engine manifold inside the throttle to the regulator outlet.

The present invention utilizes a pressure drop due to a permanent obstruction in the air intake to modify the regulator action to make it deliver fuel at a higher than normal pressure, especially for starting and idling operations. Such an obstruction is preferably one that engenders a definite minimum pressure drop at minimum air flow; such for instance as a weighted air intake valve. In practice, the commonly used oil-bath type of air cleaner provides just such a weighted valve and such a pressure drop. The invention utilizes such a pressure drop to relatively increase the reference pressure which controls the pressure at which the regulator valve opens, thereby to increase the delivery pressure of the regulator but without correspondingly increasing the pressure being applied to the fuel nozzle to draw fuel.

This application is a division of my application Ser. No. 324,986, filed December 9, 1952, now Patent No. 2,799,564. In the forms of my invention comprising the subject matter of this divisional application, the change in reference pressure is applied to the regulator by the operation of an auxiliary diaphragm exposed on its opposite faces to the ambient atmospheric pressure and the reduced pressure due to the obstruction, acting typically through springs or the equivalent.

The invention as above generally outlined will be more fully understood from consideration of the following detailed descriptions of illustrative embodiments shown in the accompanying drawings wherein:

Fig. 1 is a schematic sectional showing of one illustrative form of gaseous fuel feed system embodying the present invention;

Fig. 1a shows a modification of the device causing the pressure drop, in the form of a simple weighted valve;

Fig. 2 shows a modification in such a system as shown in Fig. 1; and

Fig. 3 shows another modification in such a system as shown in Fig. 1.

Reference is first made to the showings in Figs. 1 and 1a. Therein a typical engine carbureter is schematically indicated, including a mixture passage 10 controlled by throttle 11, having a venturi 12 with a gas feed nozzle 13 delivering at its throat. Mixture passage 10 delivers to intake manifold 19 of engine 20. Air intake passage 14 has balance passage 15, in the form of a Pitot tube, communicating with it to pick up the total air pressure; and the air intake is controlled, in Fig. 1, by the typical oil-bath cleaner 16. Such a cleaner typically involves an air tube 17 having its lower end submerged to a distance of, say, one-half inch, in oil bath 18. That distance represents the pressure drop which occurs in the cleaner at minimum (any) air flow. Above the oil bath the air flows through a filter plug 18a where the oil and dirt carried by the air are filtered out. For the purposes of the present invention it is only the pressure drop function of the cleaner that plays a part; and that function may be performed by any air intake device that imposes a definite or sufficiently large pressure drop at minimum air flow. Another such device is the weighted air intake valve 20a shown in Fig. 1a; where the weight of the valve may be so related to its effective air intake area as to provide the same pressure drop, say ½ inch water, as in the cleaner.

In Fig. 1, the essentials of a fluid pressure regulator are illustratively shown, including a pressure controlling valve 30 operated by diaphragm 32 which has one face exposed to outlet pressure in delivery chamber 34 and the other face exposed in reference chamber 36 to the reference pressure picked up by tube 15. The arrangement is such that pressure in 34 tends to close valve 30 and pressure in 36 tends to open it. As here shown illustratively in very simple form, valve 30 closes in such a direction that pressure in the initial intake 38 on the valve tends to close it; and a spring 40 may also tend to close it. The closing spring may be omitted if desired, and the valve closed simply by a regulated intake pressure on it. On the other hand, the valve may be arranged, as for instance shown in Fig. 3, to close against the inlet pressure instead of with it. In that arrangement, a spring closes the valve against the inlet pressure. And in any of the various known arrangements of the valve and its connection with its operating diaphragm, the various forces are so adjusted and related that the valve will close when pressures are equal in delivery chamber 34 and reference chamber 36, and will open when the pressure in chamber 34 is less than that in 36 by say ¼ inch water. In other words, the normal valve closing force, of spring 40 and/or the initial inlet pressure on the valve, is equal to the total force of a fluid pressure of, say, ¼ inch of water on diaphragm 32. To insure the valve always opening with small or no variation from such a set delivery pressure, the initial inlet pressure on valve 30 tending either to close or open it should preferably be well regulated, as for instance by a regulator stage preceding the one here illustrated.

In Fig. 1, if reference pressure chamber 36 is simply connected to the same static pressure that applies to nozzle 13 (for instance, if balance tube 15 is simply connected to chamber 36) the relative velocity depression in the venturi throat will not be sufficient, at starting and on idling, to open valve 30 at all, or enough to provide sufficient fuel. In the form shown in Fig. 1 the invention insures that valve opening by the following provisions:

A second diaphragm 42 is exposed on one face to atmosphere in a chamber 44 and on its other face to the pressure in a chamber 46 which is in communication with reference pressure chamber 36 of diaphragm 32. In fact, chambers 36 and 46 are functionally one, being separated only by the perforated wall 48 which merely acts as a limiting stop for inward diaphragm movement.

Diaphragm 42 carries on its outer face a cage 50 enclosing a compression spring 52 whose one end is seated against a seat 54 adjustable by a screw 56 mounted in the cage. Cage 50, it may be noted, is imperforate so as not to afford a communication between 44 and 46. The other spring end seats on a seat 58 which, when diaphragm 42 is not drawn to the right by lowered pressure in 46, is pressed by the spring against the diaphragm. Under those conditions, when the engine is standing, diaphragm 42 floats freely with atmospheric pressure on both faces and consequently spring 52 exerts no pressure on the end of the extended valve stem 60, which extends from valve 30 and is secured in diaphragm 32. However, when the pressure in 46 is reduced sufficiently below that in 44, diaphragm 42 is drawn to the right against wall 48 and spring seat 58 then seats on valve stem 60 to transmit to that stem, and the valve, a valve opening force which is adjustably set as to amount by the setting of screw 56. Assuming, for example, that the effective areas of diaphragm 32 and 42 are equal and that the pressure drop in cleaner 16 or equivalent air intake obstruction is as great as or greater than the pressure differential on diaphragm 32 necessary to open valve 30, then if the obstruction pressure drop is applied to chamber 46 to move diaphragm 42 to the position shown, spring 52 can be adjusted to apply sufficient valve opening pressure to valve stem 60 to substantially equalize all the forces acting on the valve. In the illustration here given, valve 30, standing, is closed by a force equal to ¼″ water on the effective area of diaphragm 32. The cleaner pressure drop, of say ½″ water, applies twice that force to diaphragm 42 to move it to the position shown in Fig. 1. Spring 52 then applies to valve stem 60 an opening force that is, say substantially or just equal to the ¼″ water on the diaphragm area. Under those circumstances the valve will then require only a very slight additional opening force to be exerted on it from diaphragm 32, or will be floating in equilibrium, or will be actually opened to some extent. It will suffice for this explanation and for proper operation that spring 52 be adjusted to exert on the valve an opening reference force substantially just equal to the normal valve closing force, which substantially just puts the valve floating in equilibrium under the forces tending to open and close it, excepting the differential force due to velocity depression in the venturi acting on the valve operating diaphragm 32.

When the engine is standing, the pressures on the opposite faces of both diaphragms 32 and 42 are all atmospheric. Diaphragm 42 is therefore free and spring 52 exerts no opening reference pressure on valve 30. Diaphragm 32 is also free and valve 30 is therefore held closed by the set closing pressure. In the illustration here given that pressure is equal to a differential of ¼″ water over the effective face of diaphragm 32.

On turning over the engine to start, and drawing in air through the air cleaner or equivalent obstruction, a depression of say ½″ water is applied to both the balance tube 15 and fuel nozzle 13. Diaphragm 42 is drawn to the right, applying the valve opening pressure of spring 52. Diaphragm 32 is in substantial balance with the ½″ depression applied to both faces. Valve 30 is either thereby actually opened to deliver fuel to the nozzle or is put in equilibrium so that then the very slight venturi throat depression applied to delivery chamber 34 during starting will open the valve. And on idling operation, the slight venturi throat depression will also open the fuel valve to provide fuel in proportion to the air passing through the venturi. If a relatively rich mixture is desired or necessary for starting and idling, screw 56 can be set so that valve 30 instead of being put just in equilibrium by pressure of spring 52, will be positively opened when that spring pressure is applied.

With valve 30 in balance, the pressure at which fuel is maintained in delivery chamber 34 and delivered to nozzle 13 will be substantially equal to the reference pressure in chamber 36. And that same condition of fuel delivery applies also to normal operation in all ranges; as the cleaner depression always operates to actuate diaphragm 42 as described. Thus, in normal operation of the engine in medium and higher ranges the fuel supply will always be substantially if not exactly proportionate to the air volume, because the pressure at which fuel is delivered to nozzle 13 will be always substantially the pressure which is picked up by Pitot balance tube 15 and transmitted as a reference pressure to diaphragm 32.

Fig. 2 shows a desirable modification of such a system as that shown in Fig. 1. In any such system where the pressure drop through such an oil filter air cleaner is utilized to increase the valve opening reference pressure, the oil in the cleaner may in some circumstances not be in position to give that pressure drop for idling operation. If the engine is operated for any length of time at wide open throttle and high speed the air flow through the cleaner may carry all or most of the hydrostatic head of oil up into the filter plug where it will remain as long as the fast air flow continues. That condition does not affect proper operation of the regulator as long as fast air flow exists, as the pressure drop in the air cleaner at that air flow velocity is higher than the pressure drop at low air velocities and the fuel pressure regulating valve therefore is kept in proper operation. However, if the throttle is suddenly subsequently closed the engine will drop to idling speed before the cleaner oil can drop out of the filter plug to provide the hydrostatic head necessary to give the required pressure drop at low air speeds. The arrangement of Fig. 2 overcomes that difficulty.

In Fig. 2, parts which are the same as in Fig. 1, are given the same numerals. In Fig. 2 wall 48a between chambers 46a and 36a is imperforate except for the passage 48b which passes and guides the valve stem 60. Chambers 36a and 46a are consequently separated from each other; and any leakage through 48b around the valve stem is sealed off by a spherical valve formation 42a carried by diaphragm 42 and seating on seat 48c when the diaphragm is in its operating position as shown in the figure. Balance tube 15a connects only to reference chamber 36a of diaphragm 32; and chamber 46a of diaphragm 42 is connected by passage 15b with the engine manifold by being connected directly to the manifold or to the mixture passage beyond the throttle.

The action on starting turn-over is the same as for Fig. 1. Both chambers 34 and 36a of diaphragm 32 are subjected to the cleaner depression via 15a and 13. Chamber 46a of diaphragm 42 is subjected also to cleaner depression via the connection 15b, because regardless of throttle position that depression appears in the mixture passage (manifold) beyond the throttle. At starting turn-over the connection 15b picks up substantially the same total pressure as is picked up by Pitot tube 15. Diaphragm 42 is consequently drawn to the right as shown in Fig. 2 with the same functional results on valve 30 as in Fig. 1. And in the position of Fig. 2 the diaphragm valve 42a, seating on seat 48c cuts off any leakage which might otherwise take place from the air intake via 15a, 36a, and 48b to chamber 46a and thus to the engine manifold. Any suitable form of sealing means around the valve stem to seal off the leakage may of course be used either in addition to or in lieu of the sealing valve 42a.

During all phases of engine operation, diaphragm 42 will remain in its right hand position because, regardless of throttle position, the depression obtaining in the engine manifold is always at least as great as the initial, slow air-speed, depression of the air cleaner. At the high air velocity at wide open throttle which may carry the cleaner oil up into the filter plug, the manifold depression is greater than that caused by the hydrostatic head at low velocity. And if the throttle is then suddenly closed the manifold depression, even after the engine speed falls to idling, is still greater than the depression due to the hydrostatic cleaner head. Diaphragm 42 consequently remains in operating position and continues to impose the reference force of spring 52 on valve 30, even though the cleaner may momentarily have lost the hydrostatic head which gives the operative depression at low air speeds. Under all other operating conditions the cleaner depression of at least its hydrostatic head value is applied to the several chambers and diaphragms with the same results as in Fig. 1.

Fig. 3 shows another modification of the devices of Fig. 1. Here the main diaphragm 32 has at one face delivery chamber 34 which, as in Fig. 1, communicates with fuel nozzle 13. The reference pressure chamber 36 is in communication or common with, diaphragm chamber 46 of diaphragm 42, as in Fig. 1; and both chambers 36 and 46 are again connected to Pitot balance tube 15. (As will become apparent, the modification of Fig. 2 is just as applicable to the form of this Fig. 3 as to that of Fig. 1.) Chamber 44 of diaphragm 42, as in Fig. 1, is open to atmosphere. Wall 48 between chambers 36 and 46 merely forms a stop for diaphragms 42 and 32.

Pressure regulating valve 30b is carried by a stirrup 30c on diaphragm 32 and closes onto its seat 30d in a direction against the fluid pressure in initial inlet 38a, instead of with that pressure as in Fig. 1. A spring 40b, adjustable by threaded plug 40c, exerts a pressure tending to close the valve; preferably adjusted to exert substantially just that pressure which will balance the, preferably regulated, inlet fluid pressure on the valve tending to open it.

A spring 80 bears on diaphragm 42 tending to move it to the left in the figure, that is, in a direction out of chamber 46. The two diaphragms are interconnected by a lost motion connection which will tend to move diaphragm 32 to the left, in its valve closing direction, when diaphragm 42 moves to the left. Any kind of lost motion will do, but as here illustrated, it is composed of two inter-engageable fingers 81 and 82 carried by the respective diaphragms. When atmospheric pressure attains in all the diaphragm chambers, when the engine is standing, the parts assume the positions shown in the figure and the pressure of spring 80 is applied, via the lost motion connection, to valve 30b in a closing direction. The valve is thus held closed by the force of that spring; which may be considerable, as it may be anything less than the total force which will be exerted on the area of diaphragm 42 by the depression caused by the air cleaner or equivalent obstruction in the air inlet. In this connection it is also remarked that, in Fig. 1, the normal (standing) closing force exerted on valve 30 may be anything less than the total force that will be exerted on diaphragm 42 the pressure drop of the cleaner or equivalent; spring 52 being adjusted accordingly.

On starting turn-over and on idling operation, both balance tube 15 and nozzle 13 are subjected to the depression of the cleaner or equivalent. Diaphragm 42 is drawn to the right and the pressure of spring 80 is taken off valve 30b. The valve then floats in substantial equilibrium and a slight velocity depression at the venturi will then open it. The operation is then the same as in Fig. 1.

Functionally, the devices of Figs. 1 and 3 are in substance the same. In both devices the operation of diaphragm 42, by cleaner or equivalent pressure drop, changes the forces acting on the pressure regulating valve system so as to put that valve in substantial equilibrium. In both it may be said either that a reference pressure tending to open the valve is effectively added to the forces acting on the valve, or that a valve closing pressure is effectively removed. In Fig. 3 an opening force is effectively added by taking away a closing force; in Fig. 1, a closing force is effectively taken away by adding an opening force.

In all of the several forms described, use is made of the dropped or diminished pressure due to the air intake obstruction, that is, of the difference between that pressure and that of the effective surrounding atmosphere; or, for short, of the drop in pressure due to the obstruction (e. g. cleaner). That pressure drop is utilized in all the various forms to control, in one manner or another, the application to the regulating valve of an effective valve-opening reference pressure which is greater than that exerted on the valve operating diaphragm by the obstruction-diminished pressure; the measure of the excess reference pressure being the force by which the regulating valve is normally closed.

I claim:

1. In gaseous fuel feed systems for internal combustion engines and the like, the combination of an air and mixture passage having an outlet to the engine intake manifold, an air intake and a venturi throat between intake and outlet, a permanent obstruction in the air intake positively imposing a pressure reduction with relation to atmospheric pressure on the air passing therethrough at minimum flow, a gas pressure regulator comprising a pressure regulating valve controlling gas flow from an initial inlet to a delivery chamber, a diaphragm-valve system including said valve and a valve operating diaphragm having one face exposed to fluid pressure in the delivery chamber and the other face exposed to fluid pressure in a reference chamber, the fluid pressure in the delivery chamber exerting a force on said diaphragm tending to move it in a valve closing direction and the fluid pressure in the reference chamber exerting a force on said diaphragm tending to move it in a valve opening direction, means normally applying an additional definite closing force to the valve whereby the valve is normally closed with a definite pressure when fluid pressures on opposite faces of the valve operating diaphragm are equal, a gas delivery passage leading from the delivery chamber to the venturi throat, an auxiliary diaphragm exposed on one face to the ambient atmospheric pressure and on its opposite face to the pressure in an auxiliary diaphragm chamber, means applying to the reference chamber and to the auxiliary diaphragm chamber the pressure existent in the air and mixture passage downstream of the air intake obstruction, and means actuated by movement of the auxiliary diaphragm into the auxiliary diaphragm chamber to effectively decrease the valve closing pressure exerted on the valve by the valve closing means.

2. The combination defined in claim 1, including also a throttle in the air and mixture passage down-stream of the venturi throat, and in which the means which applies the pressure existent in the air and mixture passage to hte reference chamber and to the auxiliary diaphragm chamber comprises a single passage means picking up the pressure existent in the air and mixture passage between the obstruction and the throttle.

3. The combination defined in claim 1, including also a throttle in the air and mixture passage down-stream of the venturi throat, and in which the means which applies the pressure existent in the air and mixture passage to the reference chamber and to the auxiliary diaphragm chamber, comprises a passage means picking up the pressure existent in the air and mixture passage between the obstruction and the throttle and applying that pressure to the reference chamber, and another passage means picking up the pressure in the air and mixture passage down-stream of the throttle and applying that pressure to the auxiliary diaphragm chamber.

4. The combination defined in claim 1, including also a lost-motion connection between the valve and the auxiliary diaphragm whereby valve closing pressure is exerted on the valve by virtue of the auxiliary diaphragm moving in a direction away from its chamber, and in which the valve-closing means includes a spring exerting pressure on the auxiliary diaphragm tending to move it in said direction.

5. The combination defined in claim 4, including also a throttle in the air and mixture passage down-stream of the venturi throat, and in which the means which applies the pressure existent in the air and mixture passage to the reference chamber and to the auxiliary diaphragm chamber comprises a single passage means picking up the pressure existent in the air and mixture passage between the obstruction and the throttle.

6. The combination defined in claim 4, including also a throttle in the air and mixture passage down-stream of the venturi throat, and in which the means which applies the pressure existent in the air and mixture passage to the reference chamber and to the auxiliary diaphragm chamber comprises a passage means picking up the pressure existent in the air and mixture passage between the obstruction and the throttle and applying that pressure to the reference chamber, and another passage means picking up the pressure in the air and mixture passage down-stream of the throttle and applying that pressure to the auxiliary diaphragm chamber.

7. In gaseous fuel feed systems for internal combustion engines and the like, the combination of an air and mixture passage having an outlet to the engine intake manifold, an air intake and a venturi throat between intake and outlet, a permanent obstruction in the air intake positively imposing a pressure reduction with relation to atmospheric pressure on the air passing therethrough at minimum flow, a gas pressure regulator comprising a pressure regulating valve controlling gas flow from an initial inlet to a delivery chamber, a diaphragm-valve system including said valve and a valve operating diaphragm having one face exposed to fluid pressure in the delivery chamber and the other face exposed to fluid pressure in a reference chamber, the fluid pressure in the delivery chamber exerting a force on said diaphragm tending to move it in a valve closing direction and the fluid pressure in the reference chamber exerting a force on said diaphragm tending to move it in a valve opening direction, means normally applying an additional definite force to the diaphragm-valve system whereby the valve is normally closed with a definite pressure when fluid pressures on opposite faces of the valve operating diaphragm are equal, a gas delivery passage leading from the delivery chamber to the venturi throat, an auxiliary diaphragm exposed on one face to the ambient atmospheric pressure and on its opposite face to the pressure in an auxiliary diaphragm chamber, means applying to the reference chamber and to the auxiliary diaphragm chamber the pressure existent in the air and mixture passage down-stream of the air intake obstruction, said valve closing means including a spring exerting pressure on the auxiliary diaphragm tending to move that diaphragm in a direction out of its chamber, and a lost motion connection between the auxiliary diaphragm and the diaphragm-valve system applying valve closing force when the auxiliary diaphragm moves in said direction.

8. The combination defined in claim 7, including also a throttle in the air and mixture passage down-stream of the venturi throat, and in which the means which applies the pressure existent in the air and mixture passage to the reference chamber and to the auxiliary diaphragm chamber comprises a single passage means picking up the pressure existent in the air and mixture passage between the obstruction and the throttle.

9. The combination defined in claim 7, including also a throttle in the air and mixture passage down-stream of the venturi throat, and in which the means which applies the pressure existent in the air and mixture passage to the reference chamber and to the auxiliary diaphragm chamber comprises a passage means picking up the pressure existent in the air and mixture passage between the obstruction and the throttle and applying that pressure to the reference chamber, and another passage means picking up the pressure in the air and mixture passage down-stream of the throttle and applying that pressure to the auxiliary diaphragm chamber.

10. The combination defined in claim 1, and in which the last mentioned means includes a spring operatively controlled by movements of the auxiliary diaphragm to apply and to remove spring force to and from the pressure regulating valve.

11. The combination defined in claim 1, and in which the last mentioned means includes a spring through which valve opening pressure is applied to the valve by movement of the auxiliary diaphragm into its chamber.

12. The combination defined in claim 11, and in which said spring is carried by the auxiliary diaphragm.

References Cited in the file of this patent

UNITED STATES PATENTS

| | | |
|---|---|---|
| 2,352,003 | Poinsignon | June 20, 1944 |
| 2,698,226 | Peduzzi | Dec. 28, 1954 |
| 2,736,540 | Dorland | Feb. 28, 1956 |
| 2,799,564 | Ensign | July 16, 1957 |